Figure 7:
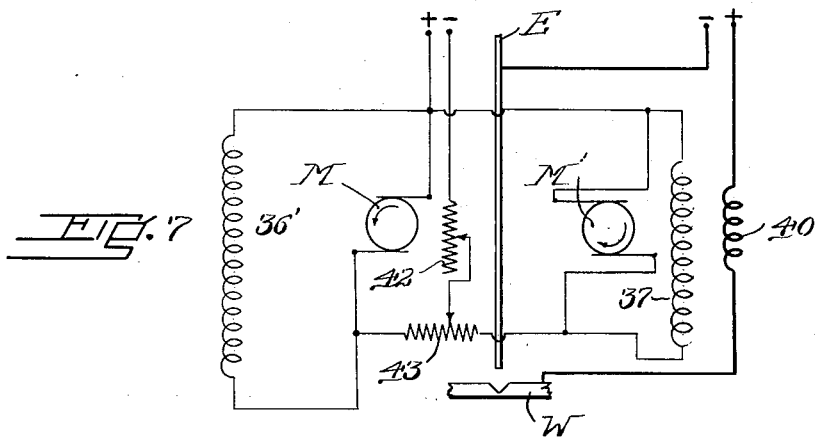

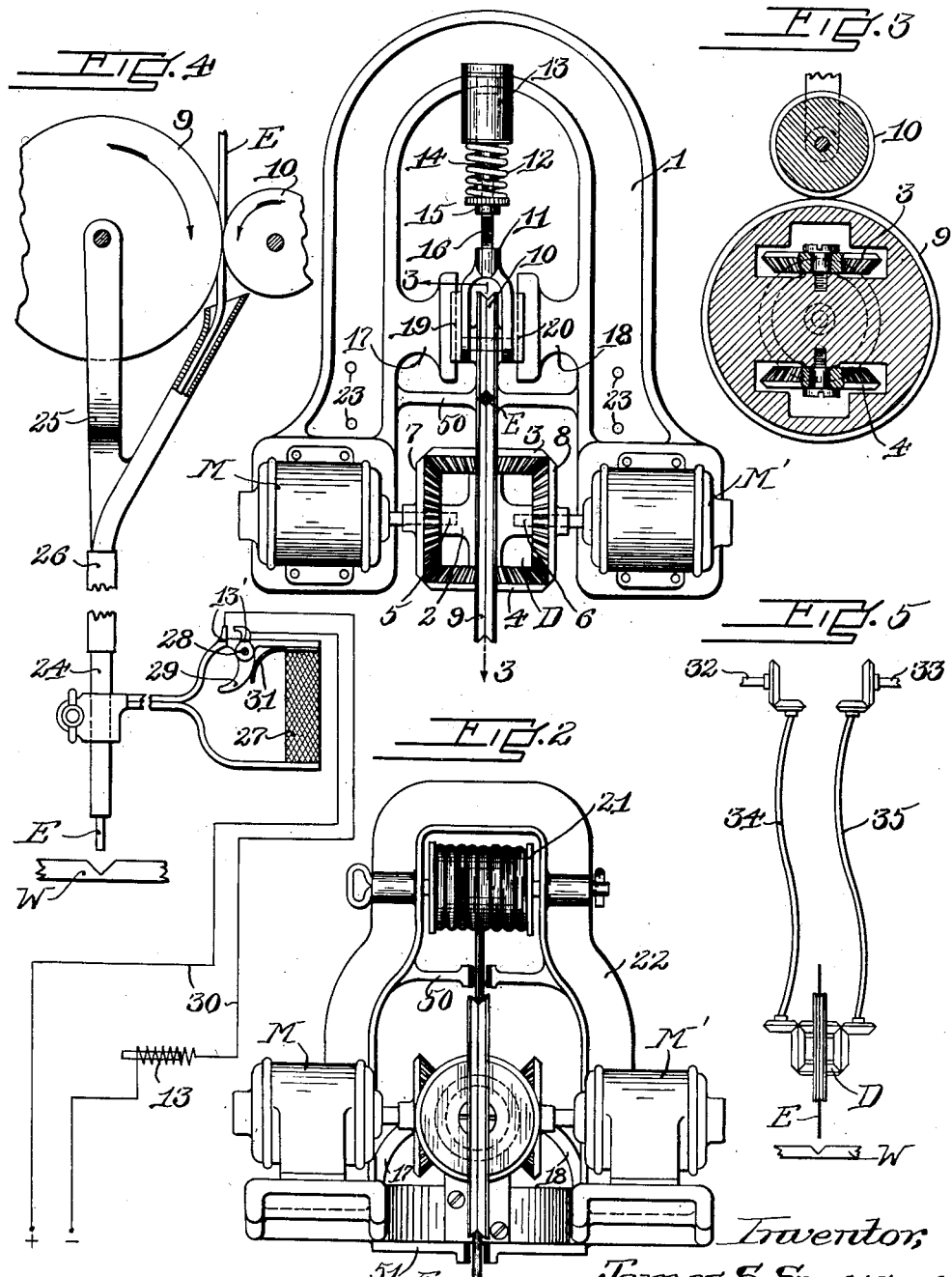

Nov. 4, 1924.

J. S. SMYSER 1,514,591

ELECTRICAL APPARATUS

Filed Nov. 25, 1921   2 Sheets-Sheet 2

Inventor,
James S. Smyser,
by Roberts, Roberts & Cushman
his attys.

Patented Nov. 4, 1924.

1,514,591

UNITED STATES PATENT OFFICE.

JAMES S. SMYSER, OF HARWICH, MASSACHUSETTS.

ELECTRICAL APPARATUS.

Application filed November 25, 1921. Serial No. 517,433.

*To all whom it may concern:*

Be it known that I, JAMES S. SMYSER, a citizen of the United States, and, resident of Harwich, in the county of Barnstable and State of Massachusetts, have invented new and useful Improvements in Electrical Apparatus, of which the following is a specification.

This invention pertains to electrical apparatus and relates more particularly to means for regulating, controlling or indicating the operation of electrical or electrically energized apparatus employing electricity in any of its various manifestations including electro-magnetism, heat, radiant energy, etc.

In such apparatus it is frequently desirable to maintain a substantially constant current in a given circuit, or by means of the electro-magnetic or other effects of such circuit to position or maintain a movable part or element in given location dependent upon the current in such circuit, and the principal object of the present invention is to provide means whereby such desired results may be obtained automatically in a simple, accurate and reliable manner.

To this end the invention comprises the employment of a movable part or element whose position corresponds with and may in some exemplifications control the current in the circuit through the apparatus to be regulated or under observation, such circuit hereinafter being referred to as the controlled or principal circuit, together with electro-magnetic means receiving current from an independent source whose absolute value, whether constant or varying, is substantially unimportant, and which determines the position of said movable part or element, and means for modifying the action of said electro-magnetic means in accordance with variations in the current in the controlled or principal circuit.

In its preferred form the invention comprises two electric motors, preferably shunt-wound motors, or other suitable motive means differentially associated with the movable part or element whose position in this preferred embodiment of the invention varies the current in the controlled or principal circuit, in such manner that the motors are adapted to move and determine the position of said movable part or element, together with means responsive to the current in the controlled or principal circuit for varying the differential action of said motive means. One or both of the motors has windings connected into the controlled or principal circuit, preferably field windings in series with said circuit, together with one or more auxiliary shunt field windings in addition to the aforesaid windings, the series and shunt windings of the respective motors being differentially and cumulatively wound respectively, the windings being so proportioned that the motor fields are substantially equal when the desired current is flowing in the controlled or principal circuit. Means such as variable resistances or other controllers are provided for adjusting the respective field circuits to cause the motors to run at substantially the same speed at any desired current value in the controlled or principal circuit whereby any variation in that current value will cause movement of the movable part or element in one or the other direction to correct such variation.

As a specific example of the use of the invention it is herein illustrated as applied to the art of arc welding and in this embodiment of the invention further objects are automatically, positively and accurately to control the position of the welding electrode relatively to the work in response to the conditions in the welding circuit, to maintain the arc current substantially constant notwithstanding variations in conditions affecting the arc, to permit adjustment of the apparatus in relation to the arc gap and welding circuit for different classes of work, to control the arc directly in response to the variations in the current flowing therein, and in general to improve apparatus of the class described.

In this exemplification of the invention the movable member or element above referred to is the electrode whose position directly determines the length of the arc gap and thus the current in the welding or controlled circuit, and the shafts of the two motors are connected through differential gearing to means for feeding the electrode either toward or from the work.

In one aspect the invention comprises means for moving the welding electrode to and from the work in combination with means for controlling the electrode movement in response to the arc current, which latter means may comprise one or more windings in series with the arc. By controlling the electrode movement in response to the arc current (in contradistinction to the arc voltage) the current may be maintained substantially constant notwithstanding variations in the fusibility and conductivity of the electrodes used and notwithstanding other variable factors such as variations in the rate at which the oxygen flame accompanying the arc gyrates about the arc.

In another aspect the invention is characterized in that the automatic control means is adapted to feed the electrode either toward or from the work instead of merely feeding the electrode toward the work at a variable rate more or less proportional to the rate of the consumption of the electrode. This affords a more responsive and accurate control of the arc and in striking the arc the electrode is automatically retracted to the proper position.

This particular embodiment of the invention is illustrated by way of example in the accompanying drawings in which:—

Figure 8:
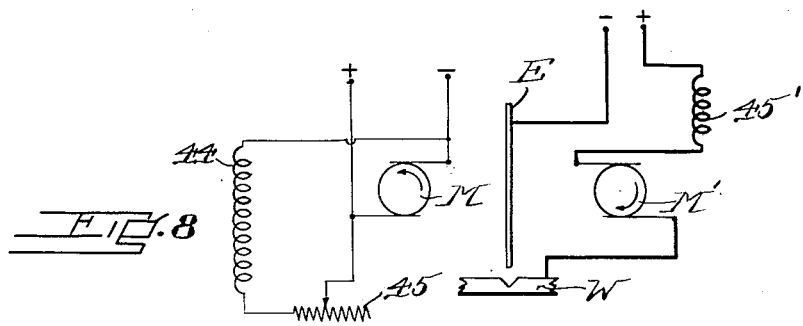
Figure 6:
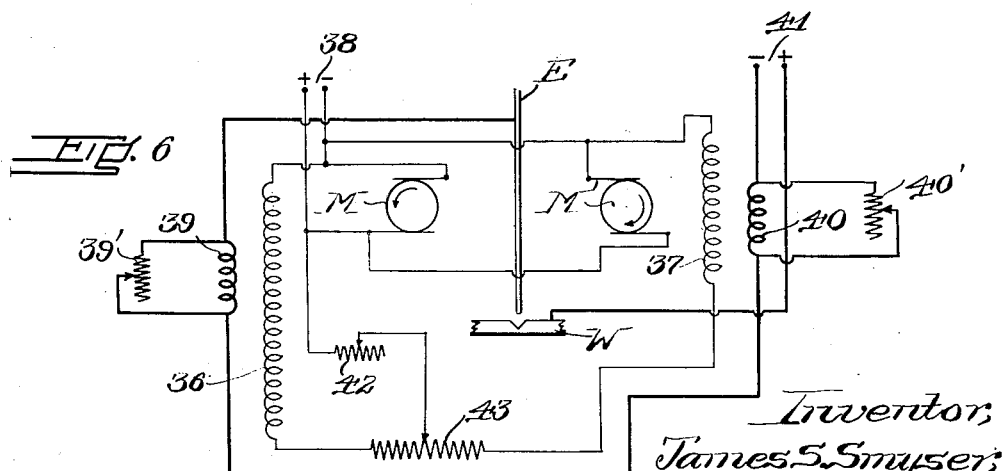

Fig. 1 is a plan view of the apparatus;
Fig. 2 is a front elevation;
Fig. 3 is a section on line 3—3 of Fig. 1;
Fig. 4 is a side elevation of a portion of the apparatus;
Fig. 5 is a detailed view indicating a modification;
Fig. 6 is a diagram showing the preferred circuit connections;
Fig. 7 is a diagram indicating a modified circuit arrangement; and
Fig. 8 is a diagram showing still another circuit arrangement.

The particular embodiment of the invention chosen for the purpose of illustration comprises a base 1, U-shaped in outline as shown in Fig. 1, together with motors M and M' mounted on the ends of the base 1, the motors being connected to a differential unit D. As shown in Fig. 3, the differential D comprises a bearing element 2 having gears 3 and 4 rotatably mounted on opposite sides thereof and having the motor shafts journaled in the other pair of opposite sides at 5 and 6. The gears 3 and 4 are interconnected by gears 7 and 8 fast to the motor shafts. The element 2 also carries a pulley 9 fast thereto with its axis in alignment with the axis of the motor shafts. A second pulley 10 is mounted adjacent the pulley 9, this pulley being journaled in a yoke 11 which is pressed toward the pulley 9 by means of a spring 12. A solenoid 13 acting on the core 14 connected to the yoke 11 is provided to retract the pulley 10 from the pulley 9 when desired, as will hereinafter appear. The effect of spring 12 is adjustable by means of a thumb nut 15 on the rod 16 connecting the yoke 11 and core 14. To support and guide the pulley 10 guides 17 and 18 are provided on base 1 in interfitting sliding relationship with guides 19 and 20 on the yoke 11. The electrode E is held between the pulleys 9 and 10 so as to be fed longitudinally upon rotation of the pulleys.

When using an electrode in the form of a wire, as is preferable, wire may be fed to the pulleys from a reel 21 rotatably mounted in a U-shaped frame 22 extending upwardly from the bridging the two arms of the base 1. While this frame may be formed integrally with the base, it is preferably formed separately and bolted to the base, 23 indicating the four holes in the base for the frames (Fig. 1). W indicates the work to be welded. To guide the electrode wire to and from the pulleys insulated guides 50 and 51 may be provided.

Owing to the great variation in conditions under which this welding apparatus may be used, no attempt has been made to illustrate the various ways in which the apparatus may be mounted or suported to adapt it to different kinds of work, but it is to be understood that the apparatus may be rigidly supported with a view to moving the work relatively thereto, during the welding operation, either manually or by automatic means, or the work may be held stationary and the apparatus moved relatively to the work by mounting the apparatus on sliding or rolling supports, or by suspending the apparatus from a traveling or swinging frame or stationary support, or in other suitable manner, the method of support being dictated by the relative size of the work and apparatus and the equipment which may be available.

Under certain circumstances, as for example, where the distance between the apparatus and the work is considerable, the portion of the electrode between the pulleys 9 and 10 and the work may be surrounded with a tubular casing as indicated at 24 in Fig. 4. This casing may be mounted to swing about the shafts of the motors by means of the yoke 25 pivoted on the shafts. To permit the welding end of the electrode to be moved relatively to the apparatus, the intermediate portion 26 of the tubular casing may be made flexible. The lower end of the casing 24 is provided with a handle 27 to hold the electrode in position laterally of the work. Instead of mounting the tubular casing to swing as shown in Fig. 4, it may be mounted on a fixed support such as shown at 51 in Fig. 2.

As shown in Fig. 4, a switch 28 for the electromagnet 13, insulated at 13', is mounted on the handle 27 and is provided with a trigger 29 for closing the circuit 30 of the magnet, a spring 31 being provided normally to maintain the circuit open. By pulling trigger 29 to energize electromagnet 13 the pulley 10 may be retracted to release the electrode E from the automatic control, whereby the electrode may be moved manually as when threading in a fresh wire.

Instead of providing a flexible support between the differential controlled pulleys and the work, the flexible connection may be located between the differential D and the motors or other motive means. Thus in Fig. 5 the differential is shown as connected to the oppositely rotating shafts 32 and 33 (which may be driven by motors as in Fig. 1) by means of flexible shafts 34 and 35.

The particular circuit arrangement for the motors M and M' as shown in Fig. 6 comprises field windings 36 and 37 connected in shunt with the motors M and M' respectively, the motors and shunt fields being connected in parallel with a source of direct current, preferably a constant potential source, indicated at 38. A variable resistance 42 is connected in series with each of the shunt windings 36 and 37, and a variable resistance 43 is so connected that the current through one shunt winding flows through one end thereof and the current for the other shunt winding flows through the other end thereof. Thus variation of the resistance 42 similarly varies the current in the two shunt windings, but variations of resistance 43 oppositely varies the current in the shunt windings, a shift of the adjustable contact to the left increasing the current in winding 36 and decreasing the current in winding 37 and vice versa. In addition to the shunt windings 36 and 37 the motors are also provided with auxiliary windings 39 and 40 which are connected in series with the electric arc and the source of arc current indicated at 41. Resistances 39' and 40' may be provided in shunt of windings 39 and 40 to reduce the current in these windings and thereby reduce the size of the motor fields.

An important feature of the circuit arrangement consists in that the windings of one motor are differentially related and the windings of the other motor are cumulatively associated. Thus in Fig. 6 windings 36 and 39 are shown as being wound in opposite directions while the windings 37 and 40 are shown as being wound in the same direction so that the windings of the motor M oppose each other while the windings in motor M' assist each other. Consequently to produce substantially equal fields for the respective motors the ratio between the number of turns in the respective windings of the field of one motor must be greater than that of the other motor. Thus in Fig. 6 the number of turns in winding 36 are represented as exceeding the number of windings 37.

By proportioning the number of turns of the respective windings and suitably adjusting the resistances 42 and 43 the motors may be caused to rotate at equal speeds at any desired current in the arc circuit, thereby maintaining the position of the electrode constant. If the distance between the electrode and the work increases beyond the predetermined distance for which the apparatus is adjusted, the current flowing across the arc gap decreases and this unbalances the fields of the two motors so that the motors rotate at different speeds, the difference in speeds restoring the electrode to normal position through the action of differential D. This will be clear by reference to Fig. 6 where it is evident that if the arc current decreases, the total field strength of motor M will increase due to the decreased differential action of winding 39 and the total field of motor M' will decrease due to the decrease of current in the cumulative winding 40; consequently the motor M will decrease in speed and the motor M' will increase in speed. Thus if the direction of rotation of the respective motors is properly predetermined this difference in speed of rotation will cause the gears 3 and 4, together with the bearing element 2 and gears 3 and 4 (Fig. 1) to creep around the axis of the motor shafts in the proper direction to feed the electrode toward the work. If the arc gap is too short, as for example, when the arc is struck, the action will be reversed and the electrode will be automatically withdrawn to the proper position. By shifting the variable contact of resistance 43 to the left the current at which the arc normally operates is increased and by shifting the contact to the right the normal arc current is decreased.

The circuit arrangement shown in Fig. 7 is similar to that shown in Fig. 6, the only difference being that the winding 39 is omitted and the number of turns in winding 36' (corresponding to 36 in Fig. 6) is decreased. With this arrangement the motor M runs at constant speed irrespective of the arc current and the automatic control of the electrode is effected solely by variations in speed of the motor M', whereas in Fig. 6 the motors vary in speed simultaneously and oppositely.

In Fig. 8 the motor M is provided with a single shunt winding 44 having a control rheostat 45, and the motor M' is a series motor having a single field winding 45' connected in series with the welding arc. In this case as in Fig. 7 the motor M runs at constant speed and the movement of the electrode is affected solely by variations in the speed of motor M' in response to variations in the arc current. Obviously any constant speed driving means might be employed in lieu of the motor M in Figs. 7 and 8.

From the foregoing it will be evident that the electrode is controlled directly in response to variations in the arc current, and that the electrode is automatically moved either toward or from the work as is required to maintain proper arc current, whereby the arc is quickly and accurately restored to normal position if for any reason it is accidentally varied from normal.

I claim:

1. Apparatus of the class described comprising two variable speed electric motors differentially associated with a movable element to move said element longitudinally in either direction, an electric circuit whose resistance is varied by movement of said element, and means including windings in series with said circuit for controlling the differential action of said motors to control the position of the movable element.

2. Apparatus of the class described comprising oppositely rotating electric motors differentially operative upon a movable element, and an electrical circuit whose resistance is varied by movement of said element, one of said motors having a field winding in series with said circuit, whereby the relative rate of rotation of said electric motors is controlled in response to such variations in resistance.

3. Apparatus of the class described comprising an electrical circuit and a movable part operative to vary the resistance in said circuit, oppositely rotating motors differentially operative upon said movable part to move the latter in opposite directions, and means for controlling the relative rate of rotation of said motors in response to variations in current in the circuit, said means including windings for at least one of the motors connected in series in said circuit.

4. In combination with an electrical circuit, a part movable to vary the resistance in the circuit, oppositely rotating motors differentially operative on said movable part to vary its position, and means for controlling the relative rate of rotation of said motors in response to variations in current in the circuit, said means including field windings for said motors connected in series in the circuit.

5. In combination with an electrical circuit, a part movable to vary resistance in the circuit, shunt motors differentially operative on said movable part to move it in opposite directions, and means for controlling their relative rate of rotation in response to variations in current in the circuit, said means including windings differentially and cumulatively associated with the shunt windings of the respective motors and in series with said circuit.

6. In combination with an electrical circuit, a member movable to vary the resistance in the circuit, a pair of variable speed motors, differential gearing mechanically connecting the shafts of the motors, means operable by the differential gearing for moving said movable member, and means responsive to varying current in the circuit for affecting the operation of the motors.

7. Electric welding apparatus comprising two electric motors differentially associated with the arc electrode to move the electrode longitudinally in either direction, and means including windings in series with the arc for controlling the differential action of said means to maintain the position of the electrode.

8. Electric arc welding apparatus comprising oppositely rotating electric motors differentially operative on the welding electrode to move the electrode longitudinally to or from the work, and means for controlling the relative rate of rotation of said motive means in response to the arc current, thereby to control the position of the electrode relatively to the work.

9. Electric arc welding apparatus comprising oppositely rotating electric motors differentially operative on the welding electrode to move the electrode longitudinally to or from the work, and means responsive to the arc for controlling the relative rate of rotation of said motive means in response to the arc current, thereby to control the position of the electrode relatively to the work.

10. Electric arc welding apparatus comprising oppositely rotating motors differentially operative on the welding electrode to move the electrode longitudinally to or from the work, and means for controlling the relative rate of rotation of said motors in response to the arc, said means including windings for said motors connected in series with the electrode circuit.

11. Electric arc welding apparatus comprising shunt motors differentially operative on the welding electrode to move the electrode longitudinally to or from the work, and means for controlling the relative rate of rotation of said motors in response to the arc, said means including windings differentially and cumulatively associated with the shunt windings of said motors respectively and connected in series with the arc.

12. Electric arc welding apparatus comprising means for automatically controlling the position of the arc electrode in response to the arc, and electromagnetic means independent of said controlling means for discontinuing the automatic control at will.

Signed by me at Boston, Massachusetts, this 21st day of November 1921.

JAMES S. SMYSER.